Aug. 4, 1959          W. S. BOEDECKER                  2,898,077
                    AUTOMATIC FILLING MANIFOLD
Filed Feb. 25, 1954                              6 Sheets-Sheet 1

INVENTOR.
Woodrow S. Boedecker
BY
Atty

Aug. 4, 1959 W. S. BOEDECKER 2,898,077
AUTOMATIC FILLING MANIFOLD
Filed Feb. 25, 1954 6 Sheets-Sheet 3

INVENTOR.
Woodrow S. Boedecker
BY
Atty.

United States Patent Office 2,898,077
Patented Aug. 4, 1959

2,898,077

AUTOMATIC FILLING MANIFOLD

Woodrow S. Boedecker, Chicago, Ill., assignor to The Bastian-Blessing Company, Chicago, Ill., a corporation of Illinois Application February 25, 1954, Serial No. 412,605

5 Claims. (Cl. 249—63)

This invention relates to an apparatus for automatically stopping the flow of fluid material at the fill limit in the filling of storage containers and other devices receiving a predetermined amount of fluid material having particular reference to the filling of fuel storage liquified petroleum gas containers, it being appreciated that the invention is capable of use for filling containers or cylinders with any materials which can be scale weighed.

Many products which are stored under pressure in containers, as well as many commodities which are sold or handled under volume or weight restrictions exacted by law or safety requirements, have to be handled under strict weight or filling limitations.

By way of example, it is required by law that LP-gas, whether it be propane or butane or mixtures thereof, must be stored or transported in pressure tanks with a predetermined outage space for liquid expansion in relation to a variable factor such as temperature. LP-gas varies in volume due to expansion thereof with increased temperatures. Those agencies which supply LP-gas for home or industrial uses do so in small portable containers with differential weight measurement rather than trouble the operators filling the containers with mathematical formulas involving outage measurements at different temperatures.

In filling the portable containers which are rated according to ICC standards of 60 or 100 pounds, an empty container, marked with its tare weight, is placed upon a scale and charged with LP-gas until a predetermined weight is reached above the tare weight whereupon the flow of LP-gas is interrupted. If the shut-off is done manually, the operator has to be very attentive at all times in order to prevent overfilling for safety reasons or underfilling for sales reasons and, rather than be bothered with the long process of removing excess liquid from an overfilled container to meet the safety requirements of the law, the operator prefers to underfill rather than overfill.

Many other problems are involved with manual filling as is evidenced by the fact that several devices are now on the market which endeavor to eliminate the human factor in the filling of ICC cylinders with LP-gas.

Conventional shut-off devices heretofore being used are dependent upon outside or independent sources of power or energy. Any failure in a source of power will permit overfilling if manual control is not immediately established and a whole line of filling devices may be shut down. Moreover, conventional devices, in utilizing outside sources of energy, are confronted with the expense not only of the power but of the cost of servicing and maintaining apparatus which makes the power available to control filling operations. In this last instance, even when the conventional fill-limiting device has shut off the filling operation, it has been found that energy continues to be expended, whether it be electrical or in the form of air pressure or some other form, until the operator returns to remove the cylinder and replace it with another to be filled.

The principal object of the present invention is to provide a device of the class described which eliminates the above objections; will provide a constant repeated operation each time that it is performed and, if anything goes wrong with the system due to damage thereto, the filling operation is instantly "made safe" until repair is accomplished.

A further object of the present invention is to provide an automatic filling shut-off which is self-contained without any dependency upon outside sources of power, easily brought into operation with only the manual cocking of only one element to start the filling operation, after which the operation of the device is completely automatic without further attention and with a degree of accuracy greater than heretofore experienced with conventional devices.

Another object of the invention is to provide an accurate, easily actuated fill-limiting device which can be operated any place, without being connected to any source of energy, and which enables the filling of heavier tanks at the point of use from a truck tank, inventory and transportation of tanks being thereby greatly reduced.

A further object of the invention is to provide a device which is easily repaired and readily handled by those unskilled mechanically without need for more than nominal instruction.

The invention is further characterized by the use of elements with which actuation at the weighing point of an automatic fill-limiting device is instantly effective at the flow control point thereof, regardless of where the flow control point is located within the system.

Another object of this invention is to provide an improved means for automatically stopping the flow of gas or liquid instantly when a predetermined weight over the tare weight of a storage receptacle is reached.

Another object of the invention is to provide a simple safety lock arrangement which prevents inadvertent or malicious actuation of the filling apparatus from discharging any gas unless the filler hose is connected to a cylinder.

A further object of the invention is to provide a shut-off mechanism which is relatively simple to operate, inexpensive to manufacture, highly efficient, reliable in operation and extremely compact.

These being among the objects of the present invention, other and further objects will become apparent from the description and drawings in which.

The invention is embodied generally in a mechanism in which a shut-off valve controlling the flow of liquefied gas to a storage container located on the platform of a scale is opened hydraulically by manually cocking a weight bearing lever. The lever engages a piston that is forced to and is latched in pressure applying position. When the weight bearing lever is actuated by the scale beam at a predetermined scale reading, it falls and releases the latch and thereby releases the hydraulic pressure to permit the valve to close instantly.

Figure 1:
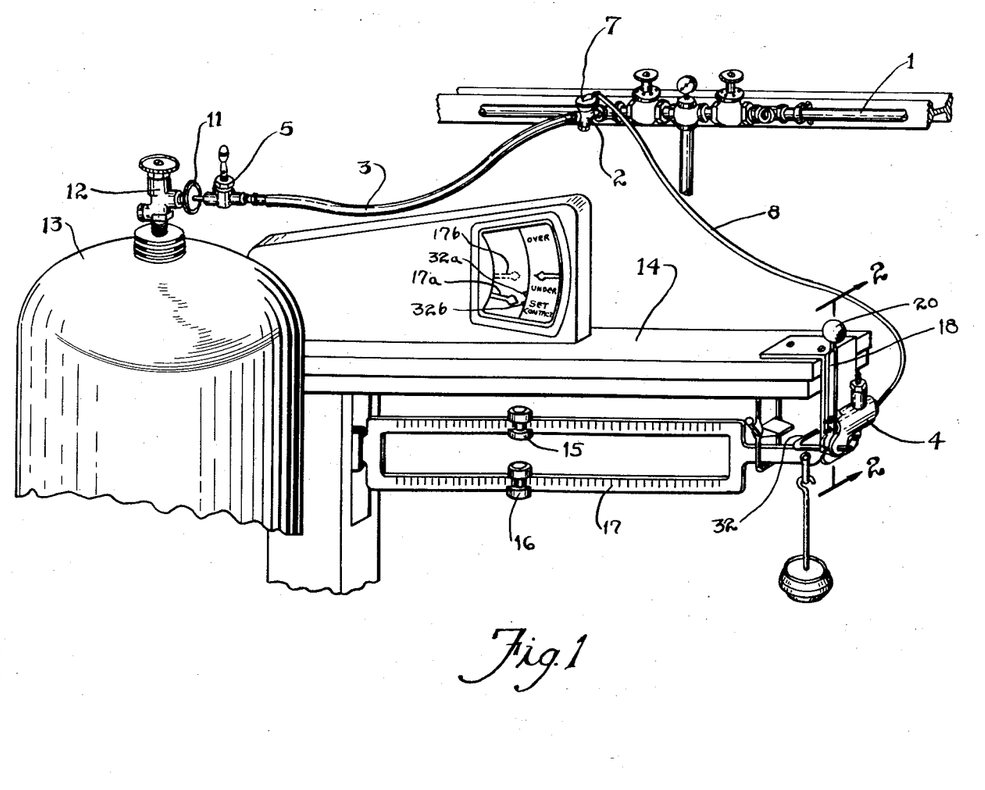
Fig. 1 is a perspective view taken from the front of a device embodying the preferred form of the invention.

Referring to the drawings in further detail the apparatus comprises a supply manifold 1 from which propane gas in its liquid phase is supplied under pressure to a portable cylinder 13 through a filler valve 2, a filler hose 3 and a safety shut-off valve 5 releasably connected to the cylinder valve 12 of the storage cylinder 13. A spinner type hand wheel 11 generally used for making a quick union is employed for attachment of the valve 5 to the cylinder valve 12. The filler valve 2 is attached to the manifold 1 and the valve 5 is attached in sealed relation to the cylinder valve 12 by means of conventional pipe thread joints such as a swivel and nut assembly 6 (Fig. 14) often referred to in parlance as a P.O.L. connection.

A hydraulic master cylinder 4 located on the scales 14 is connected to the upper part of the bonnet 7 of the control valve 2 by a hydraulic hose 8. It is through the hose that the hydraulic fluid 21 passes to the bonnet 7 of the filler valve 2 above the diaphragm 25 when the master cylinder 4 is cocked. Hydraulic pressure above the diaphragm 25 opens the valve 28.

Figures 2, 3, 4:
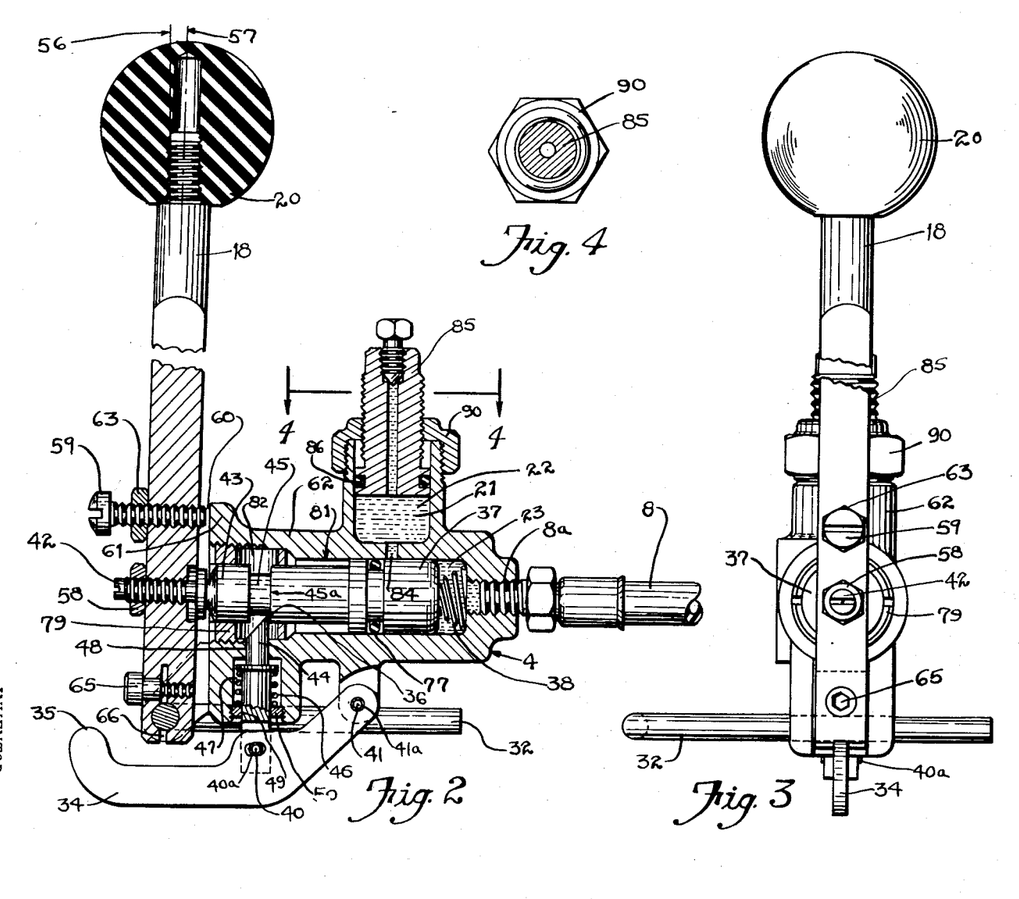
Fig. 2 is an enlarged vertical section through the master cylinder or cocking valve mechanism taken on line 2—2 in Fig. 1 showing the position of the parts when the mechanism is in a cocked or "on" position.
Fig. 3 is a front elevation of the device shown in Fig. 2.
Fig. 4 is a horizontal sectional view taken on the line 4—4 in Fig. 2.
Figure 5:
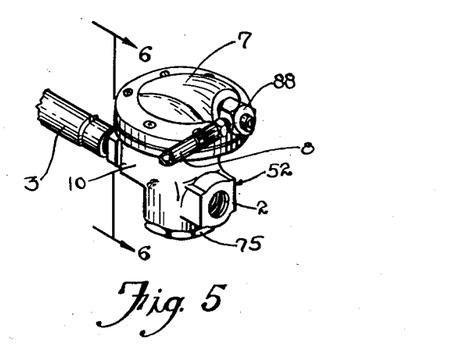
Fig. 5 is an enlarged perspective view of the filler valve shown mounted on the manifold in Fig. 1.
Figures 9, 10, 11, 12:
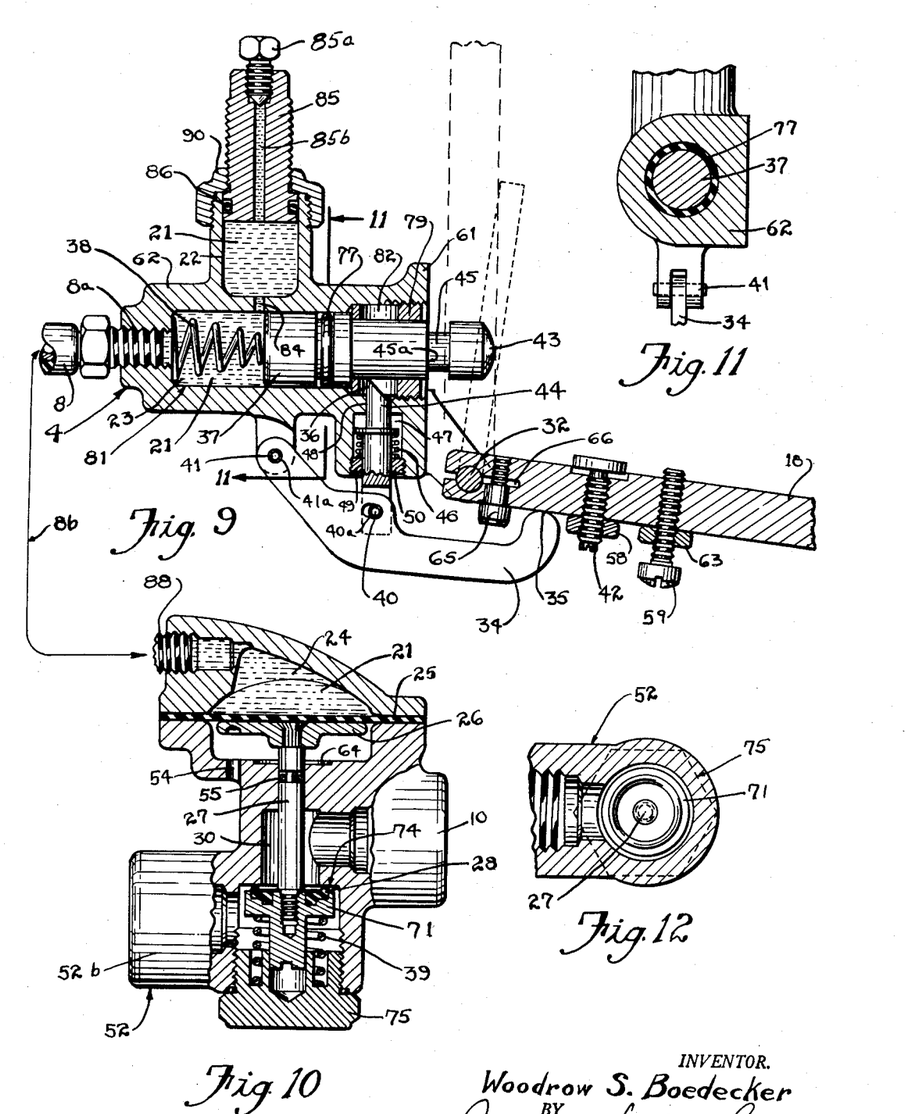
Fig. 9 is an enlarged vertical section through the master cylinder or cocking valve mechanism, showing the position of the parts illustrated in Fig. 2 when the mechanism is in an un-cocked or "off" position.
Fig. 10 is a vertical longitutdinal sectional view of the filler valve illustrated in Fig. 6 showing the valve in a normally "closed" position.
Fig. 11 is a horizontal cross section taken on the line 11—11 in Fig. 9.
Fig. 12 is a horizontal cross section taken on the line 12—12 in Fig. 6.

The hydraulic master cylinder 4 as more particularly shown in Figs. 2, 3 and 9 comprises a body 62 having a cylindrical bore 81 therein preferably disposed in a general horizontal position. At one end the hydraulic hose connection 8 is threaded into the body as at 8a in communication with the cylinder 81. At the other end of the cylinder 81 a piston 37 is slidably mounted as urged in an outward direction by the compression spring 38 to urge the piston to a normally retracted position. The piston 37 includes an elastomer sealing gasket 77 sometimes referred to as an "O-ring" and has on it a head 43 connected thereto by a reduced neck portion 45 which provides outwardly facing shoulders 45a. Around the shaft portion of the piston is mounted an assembly nut 79 having radial openings 82 therein through which a latch member 44 extends to engage against the shoulder 45a when the piston is in an advanced position. The latch 44 in turn is urged by a compression spring 46 backed up by a mounting nut 50 to its raised or latching position and is lowered from its raised position by a trip lever 34. The trip lever is pivotally mounted at its inner end as at 41 to the body 62 and pivotally carrying intermediate its ends as at 40 to the lower end of the latch member 44 so that when the latch is free to move upwardly the spring 46 carries the latch edge 36 upwardly and along with it the lever 34. The converse is true that when the lever 34 is depressed downwardly at its outer end it carries with it the latch 44 against the action of the spring 46.

Also pivoted to the body 62 is a cocking lever 18 pivotally mounted at one end on the pivot pin 32 to which it is snugly secured by a split yoke arrangement 66 and a clamping screw 65. Pivotal movement of the cocking lever 18 carries an adjustable target screw 42 into engagement with the head 43 of the piston to force it to its latched position. The target is adjusted and held in place by a lock nut 58 to carry the shoulder 45a on the piston past the latch element 44 to lock it in advance position. A screw 59 and lock nut 63 assembly prevents overloading the piston. The two adjustments cooperate in a novel manner. The stop screw 59 actually determines the depth to which the piston is advanced past the latch 44 and the target screw 42 engaging the cylinder serves in combination with head of the piston 43 in its latched position to determine the upper balancing position of the cocking lever 18. The preferred balancing position is shown in dotted lines in Fig. 9 and in full lines in Fig. 2.

In order to prevent the hydraulic system from becoming airbound or having a compressible fluid present in the hydraulic system, a reservoir 22 is cored in the upper part of the body 62 with a bleed-hole 84 interconnecting it with the cylinder 81 just in front of the piston 37 when the piston is in its fully retracted position. By way of supplying the reservoir 22 for hydraulic fluid 21 with a means to indicate the relative level therein of the fluid, a piston-like element 85 is threaded through a gland nut 90 to be advanced and retracted as sealed from the reservoir by an "O-ring" 86. A conduit disposed axially through the piston 85 serves as a means for replenishing the reservoir or draining it whenever the nut 90 is removed. Whenever it is desired to fill the reservoir the piston 85 is removed and oil poured in, and whenever it is desired to remove air from the reservoir the screw 85a is removed and the piston 85 turned downwardly until the oil level rises to the top of the piston in the passageway 85b therethrough.

Whenever the piston 37 is advanced by raising the cocking lever 18 to its upper position, the piston is forced inwardly displacing some liquid therein through the opening 84 into the reservoir and along with it any air bubbles which might have collected in the top side of the piston until the piston 37 passed beyond the opening of the passageway 84. Thereafter, hydraulic liquid is forced out of the cylinder 81 into the hydraulic hose 8.

As shown by the interconnecting arrow line 8b, the hose 8 leads to the filler valve 2 as shown in Fig. 10 where it is secured to the bonnet 7 as indicated at the threaded coupling 88.

Figure 6:
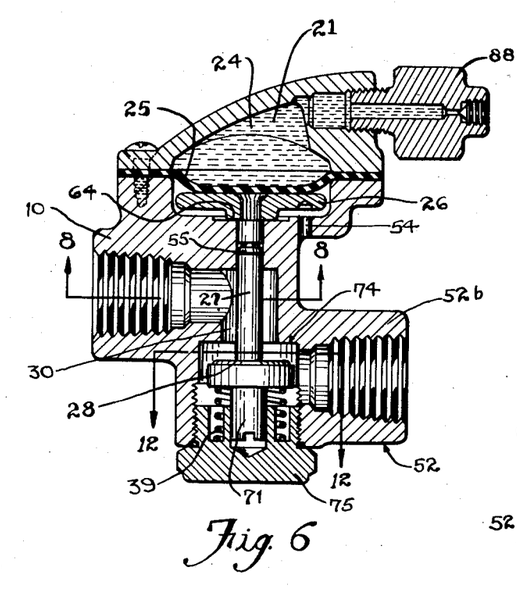
Fig. 6 is a vertical longitudinal sectional view of the filler valve taken on line 6—6 in Fig. 5 showing the valve in a normally "open" position.
Figure 7:
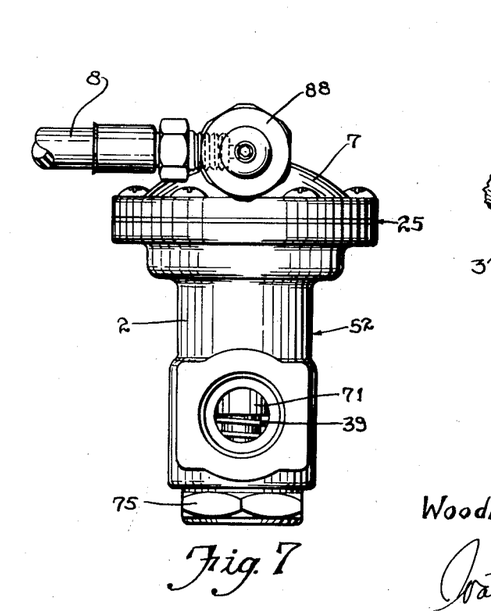
Fig. 7 is a front elevation view of Fig. 6.
Figure 8:
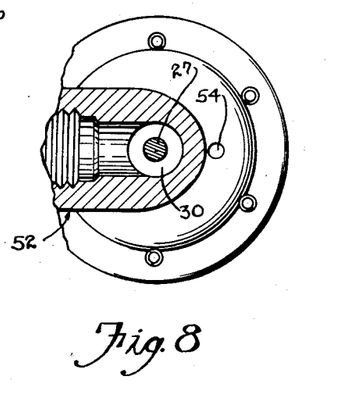
Fig. 8 is an enlarged horizontal section taken on line 8—8 of Fig. 6.

The filler valve comprises a body 52, an inlet boss 52b which leads to a valve compartment closed by a gland nut or back cap 75 arranged in axial alignment with the passageway leading from the enlarged valve compartment below a reduced portion that defines a shoulder 74 which serves as a valve seat around an opening 30. The outlet of the valve is indicated at 10 (Figs. 6 and 10). The valve member 71 is a circular member having a shoulder on it engaged by a compression spring 39 that is backed up by the back cap to urge the valve member 71 towards the valve seat 74 to carry a valve disc having a rounded land 28 thereon into sealed relationship with the valve seat 74 in the direction of flow of fluid therethrough. Beyond the opening 30 the body is bored to receive the stem 27 of the valve which has an "O-ring" 55 thereon of a resilient material disposed in a circumferential groove on the stem to seal the sliding movement between the stem and the body from any escape of gas under pressure.

The outer end of the stem is fastened to a metal plate 26 which engages the bottom side of a diaphragm 25. Thus whenever the diaphragm 25 is forced downwardly, movement is transmitted to the valve member 71 through the valve stem 27 to move the valve member 71 to its open position, and, whenever the diaphragm 25 is free to do so, the force of the spring 39 below the valve member 71 is enough to return the diaphragm 25 to the position shown in Fig. 10 from the position shown in Fig. 6. The bonnet 7 which provides a hydraulic chamber above the diaphragm 25 in communication with the hydraulic cylinder 81 through the hydraulic hose 8 is mounted upon the valve body 2 by screws as shown in Fig. 6 to place a margin of the diaphragm under compression and seal the system from any escape of hydraulic fluid. Preferably the space below the diaphragm 25 in which the plate 26 moves is vented to the atmosphere through the opening 54.

Having thus described the preferred embodiment of the invention it would be well to consider its operation before describing modifications. The cylinder 13 having a conventional shut-off valve 12 is set in place on the platform (not shown) of a scale 14 which is equipped with sliding weights on a beam 17. The quick-acting valve 5 which is a cam released manual shut-off valve is connected to the cylinder valve 12 by means of a spinner wheel 11. The runner 15 on the upper portion of the beam of the scales is set to the tare weight appearing on the cylinder and a second runner 16 on the lower portion is set to the predetermined weight in pounds to which the cylinder is to be filled. The cocking lever 18 which has the ball weight 20 on its free end is raised and pushed towards the scales in a vertical position as more clearly shown in Fig. 1 and Fig. 2. This engages the piston to advance it and causes the hydraulic fluid 21 which is contained in the chambers 22 and 23 of the master cylinder 4 to pass into the hydraulic hose 8 while other hydraulic fluid in the hose 8 at its other end is forced into the bonnet chamber 24 to depress the diaphragm 25 downwardly as shown in Fig. 6. This downward movement of the diaphragm 25 carries the diaphragm plate 26, the valve stem connected thereto, and the valve member 28 in a downward direction to open the valve at the valve seat 74. This permits propane to flow in its liquid phase from the manifold 1 through the filler hose 3 into the hand shut-off valve 5 whereupon the hand shut-off valve 5 is manually opened to permit free passage of the propane into the cylinder 13 through the valve 12.

When the cylinder 13 is filled to its desired weight, the normal upward movement of the scale beam 17 causes an upset lever to be pushed in an upward direction and pass the weight 20 on the upper end of the cocking lever past a true vertical direction 56 to start its fall in an outward direction. In falling, the lever 18 contacts the trip lever 34 on its outer end 35 and under the inertia of the falling weight releases the latch 44 to allow the piston 37 aided by the force of the hydraulic fluid 21, the helper spring 38 in the master cylinder 4 and the spring 39 in the back cap of the filler valve 2 to push the valve into a closed position as more clearly shown in Fig. 9. It is preferred to support the trip lever 34 on two journal points by roll pins 40a and 41a for quick and frictionless action.

Thereafter the safety manual cut-off valve 5 is closed and the spinner nut 11 released. Closing the hand valve prevents escape of propane from the filler hose 3 between filling operations and when another cylinder is placed on the scale to take the place of the one filled, the above operations are repeated.

From the description thus far it will be readily apparent how the objects are attained and how the unit is a self-contained, self-energized one, independent of any outside source of power or energy and can be used on portable trucks as well as at any stationary filling point. Moreover, it will be appreciated that the scales can be a portable, beam suspension type capable of supporting the cylinder in a depending fashion by a suitable connection with the cylinder valve and once the filling operation is started no further attention is required from the operator until the filling operation has been completed.

By way of a fuller understanding of the adjustment of the cocking lever, whenever the lever 18 of the master cylinder 4 is pushed forward to a vertical position the adjusting screw 42 comes in contact with the piston 37 at the rounded point 43 to displace the piston 37 until the point 36 of the sliding latch 44 falls into the groove 45 on the piston 37. Thus the piston is secured in the cocked position. The upward movement of the latch 44 is accomplished by the action of the compression spring 46 located in the bore 47 of the master cylinder. The latch 44 is guided at points 48 and 49 for quick and accurate movement as retained in place by the plate 50. Thus, not only is the latch operated like a sear to trigger-release the piston, but even the load of releasing the latch is removed from any element or source of power which might cause a variable in the filling of the cylinder.

When the master cylinder 4 is first attached to the scale 14 the cocking lever 18 is set to a position which is slightly past the vertical balancing point indicated by the numeral at line 56 in Fig. 2, it being preferable to have this over-center position of the cocking lever 18 at a slight angle such as indicated at 57. This prevents the cocking lever 18 from falling until the upset arm 32 is normally activated yet permits its activation with the slightest force that is nevertheless a constant in the filling operation, involving merely the increasing weight of the cylinder as it is being filled.

In order to place the cocking lever at the proper vertical position, the adjusting screw 42 is rotated in a clockwise direction with a screw driver until the desired position is reached at which time a lock nut 58 is securely tightened. With the lever in this position the adjustment screw 59 is rotated until a slight space 60 is left between the surfaces of the adjusting screw 59 and the lug 61 on the body 62. This prevents the operator from doing any damage to the system by abusive movements of the controlling lever. The lock nut 63 is then securely tightened in place. The stop 64 in the filler valve body 52 also is provided for extreme over-controlled condition which prevents fatiguing of the diaphragm in the filler valve. After the correct lever position has been established the upset arm 32 is adjusted next. With the scale beam 17 set to its approximate center point or normal balance position the upset arm 32 is lowered until it is lightly contacting the upper part of the scale beam 17. At this point the set screw 65 is securely tightened through means of compression of the slot 66 in the lever 18. The unit is now in correct working order and no further adjustment need be made, it being appreciated that the effort required to actuate the lever 18 and move the weight 20 past the vertical center 56 is a constant recurrent load discharged by the scale during the last increment of filling after which the scales are free of any outside influence or burden when the filling operation is terminated so that the reading of the scale is absolutely accurate every time before the cylinder is disconnected and removed therefrom, the effective weight of the filler hose and valve being a factor which is constant and allowed for in the first adjustment of the scales. In accomplishing this, it is preferred to set the tilt arm 32 at a point where it engages the beam of the scales below the point of indication a distance sufficient as indicated by full line 17a opposite the notation of "set contact." Movement of the beam between points 32a and 32b moves tripping lever 32 to start the fall of the cocking lever 18. When this effort is released from the beam, it rises to the point indicated as the fill limit in dotted lines 17b. Thus the filling can be controlled within a couple of ounces of the exact weight required.

Figure 13:
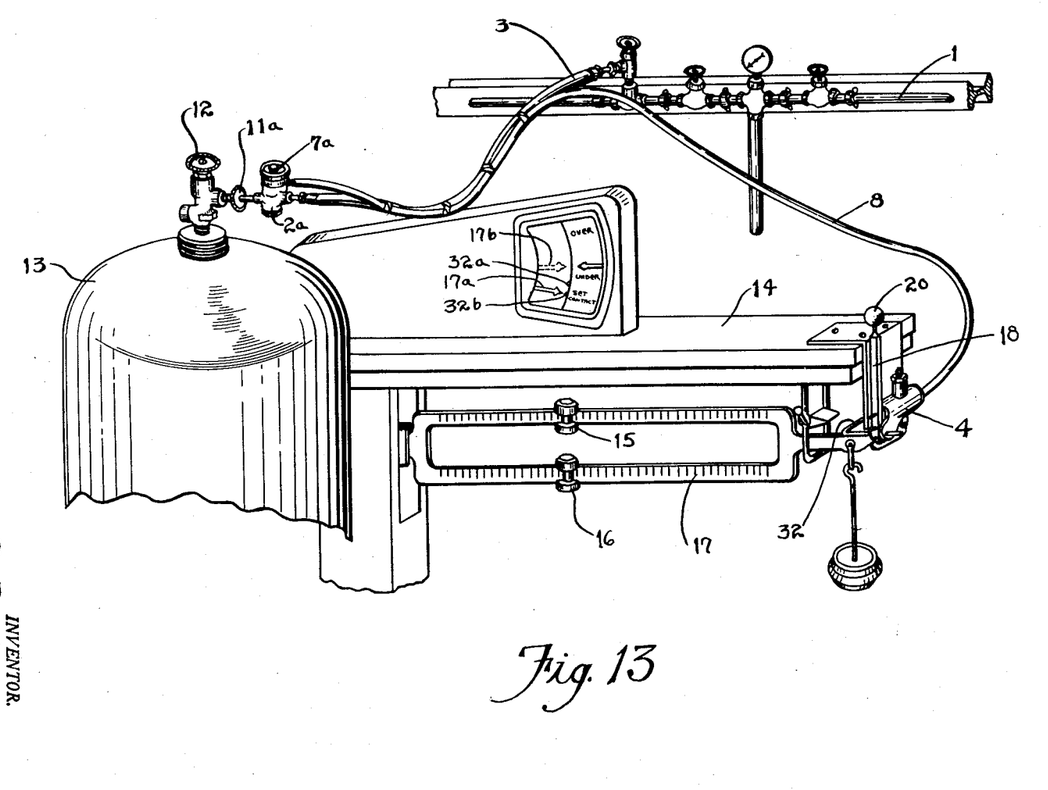
Fig. 13 is a modification of the mechanism shown in Fig. 1 wherein the filler valve shown in Fig. 5 is located at the outlet end of the filling hose rather than the inlet.

A modified unit is more clearly shown in Fig. 13 and is constructed and arranged as already described in the previous embodiment except that the filler valve 2a is located at the outlet of the filler hose 3 instead of at the inlet and takes the place of a manual cutoff valve 5. This mechanism is operated identically with the preferred construction heretofore described with the addition of a safety means which prevents inadvertent or malicious operation of the cocking lever 18 when no cylinder is upon the scales.

In order to eliminate the hazard of malicious and dangerous escape of propane gas a safety latch 91 is shown which is enclosed in the intermediate cavity 53a of the filler valve 2a. This latch prevents the opening of the filler valve 2a until the proper connection is made to cylinder 13. This is more clearly shown in Fig. 14 where the solid outline 92 of the wheel handle 11a and latch 91 represent the relative position when the proper connection to the cylinder has been made. The dotted outline 93 of the wheel handle 11a and latch 91 indicate the position of the latch when the filler valve 2a is disconnected from the cylinder valve 12.

The latch 91 is a stamping of sufficient strength having a yoke shape 94 on one end and a raised protrusion 95 on the other end. The yoke 94 is retained in a groove 96 on the shank 97 of the wheel handle 11a. The latch is held in place by a retaining screw 98 and is guided by means of contact with side walls 99 provided for that purpose upon the body 52a. In order to insure a positive return action on the latch a spring 100 is provided which is retained by the screw 101 with one of the legs 102 of the spring in contact with the annular body wall 103 and the other leg 104 impinging on the raised protrusion 95.

Figures 14, 15, 16:
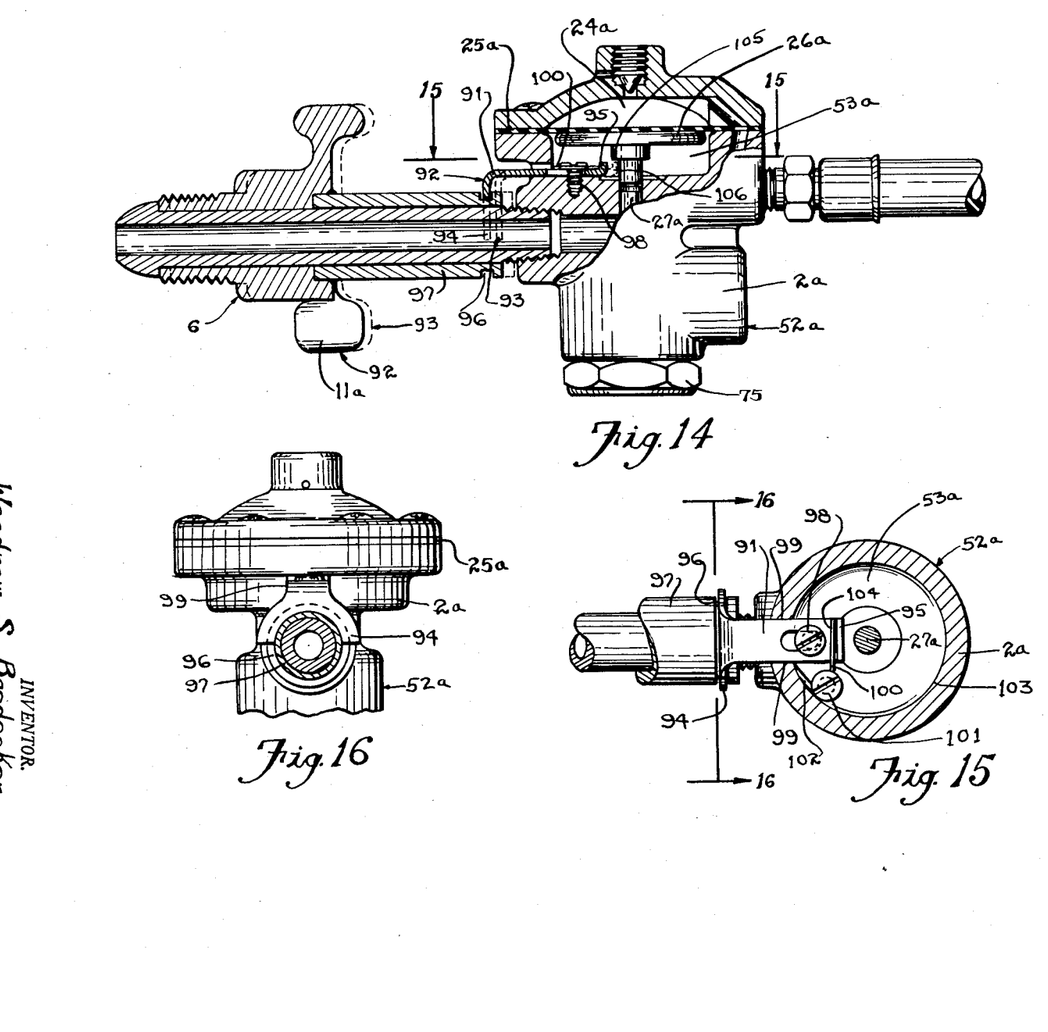
Fig. 14 is an enlarged partial vertical cross section of a modified filler valve similar to the one shown in Fig. 5 equipped with a safety lock which is used to prevent the accidental cocking of the control mechanism.
Fig. 15 is a horizontal cross section taken on line 15—15 in Fig. 14.
Fig. 16 is an enlarged partial side elevation and vertical section taken on line 16—16 in Fig. 15.

Referring to Fig. 14 it will be noted that as the hand wheel 11a is threaded into the cylinder valve 12 the protrusion 95 on the latch will slide forward out from under the shoulder 105 of the diaphragm plate 26a. This position is shown by the solid outline 92 of hand wheel 11a and latch 91. When the locking lever is operated in the normal manner this permits the oil pressure in the chamber 24a to depress the diaphragm 25a and cause the valve stem 27a and seat carried thereby to open to permit propane gas to flow into the cylinder. On the other hand, if the hand wheel 11a is not engaged in the cylinder valve 12 the raised protrusion on the latch will act as a wedge which is more clearly shown by the dotted outline 106 in Fig. 14. If the diaphragm is not free to be forced down by hydraulic pressure, the hydraulic displacement thereof is prevented and as soon as a person releases the cocking lever 18 it will fall to the valve closing position since the hydraulic fluid trapped between the piston and the supported diaphragm plate will prevent the cocking lever being advanced to its over-center position. Thus the apparatus cannot be left in a dangerous arrangement yet is readily operable by a person capable of securing the filler hose to the cylinder followed by a mere raising of the lever.

Having thus described the invention and several embodiments thereof, it will be readily apparent to those skilled in the art how other and further modifications can be made in satisfying the objects stated herein without departing from the spirit of the invention, the scope of which is commensurate with the appended claims.

What is claimed is:

1. A filling device of the character described comprising a scale having a movable indicator beam thereon, means for supporting an empty container on the scale in weight measuring position, means for connecting the container so supported with a source of fluid material including a flow control device automatically actuated by hydraulic pressure, a master hydraulic cylinder in communication with the control device and having a piston therein, a predetermined quantity of hydraulic liquid affording said communication between said master cylinder and said control device, a gravity responsive lever adapted to be moved against the force of gravity for advancing the piston to develop hydraulic pressure in said cylinder when the lever is moved from a lower to an upper position, a latch element held out of latching position by the lever in its lower position for engaging the piston to hold it in its advanced position when free to do so, and means actuated by said beam for displacing said lever from its raised position by movement of said beam through a predetermined arc below a predetermined balanced position.

2. A filling device of the character described comprising a platform scale having a movable weight indicator beam thereon, means for connecting an empty container resting upon the platform of the scales with a source of liquefied petroleum gas under pressure including a diaphragm valve having a sealed bonnet chamber, a master hydraulic piston and cylinder assembly in communication with the sealed bonnet, a predetermined quantity of hydraulic liquid affording and communicating between said cylinder and said valve and a gravity responsive means adapted to be moved against the force of gravity to an upper position for displacing the piston to develop hydraulic pressure in said cylinder, a latch element engaging the piston in its displaced position, said gravity responsive means being released by movement of said beam through a predetermined arc below a predetermined balanced position, and means engaged by said gravity responsive means in its released position for releasing said latch to automatically close the flow to the container.

3. A filling device of the character described comprising a scale having a movable indicator beam thereon, means for supporting an empty container on the scale in weight measuring position, means for connecting the container to a source of liquefied petroleum gas under pressure including a hydraulically opened valve, a master hydraulic cylinder in communication with the valve and having a piston therein, a predetermined quantity of hydraulic liquid affording said communication between said master cylinder and said valve and means for developing hydraulic pressure in said master cylinder including a gravity responsive member adapted to be moved against the force of gravity to an upper position and a latch element engaging the piston released by said gravity responsive member actuated by movement of said beam through a predetermined arc below a predetermined balanced position to automatically close the flow to the container.

4. A cylinder filling device for use in combination with a platform scale comprising means for connecting an empty container with a source of fluid under pressure including a valve, said valve having a diaphragm therein actuated by hydraulic pressure to open the valve, hydraulic means for actuating said diaphragm including a gravity responsive lever adapted to be moved against the force of gravity to an upper position, a hydraulic device actuated thereby and a predetermined quantity of hydraulic liquid, means for maintaining hydraulic pressure above said diaphragm when said actuating means is in said upper position, and release means engaged by the scale for actuating the gravity responsive means and releasing the last said means when a predetermined weight has been placed upon the scale to automatically close the flow to said container.

5. A filling device of the character described comprising a platform scale having a movable weight indicator beam thereon, means for connecting an empty container resting upon the platform of the scales with a source of liquefied petroleum gas under pressure including a diaphragm valve having a sealed bonnet chamber, a master hydraulic piston and cylinder assembly, a flexible connector between said cylinder assembly and bonnet chamber placing the cylinder in communication with the sealed bonnet, a predetermined quantity of hydraulic liquid in said connector, cylinder and valve bonnet by which the diaphragm is actuated when the piston is displaced, gravity responsive means adapted to be moved against the force of gravity for displacing the piston to develop hydraulic pressure in said cylinder connector and bonnet for actuating said valve, a latch element engaging the piston in its displaced position, means released by movement of said beam through a predetermined arc below a predetermined balanced position for releasing said latch and thereby the piston to automatically close the valve and thereby stop the flow to the container.

References Cited in the file of this patent

UNITED STATES PATENTS

| | | |
|---|---|---|
| 1,108,974 | Crandall | Sept. 1, 1914 |
| 1,502,041 | Loepsinger | July 22, 1924 |
| 2,055,347 | Hackman | Sept. 22, 1936 |
| 2,264,562 | Bryant | Dec. 2, 1941 |
| 2,406,263 | St. Clair | Aug. 20, 1946 |
| 2,408,842 | Garretson et al. | Oct. 8, 1946 |
| 2,544,734 | St. Clair | Mar. 13, 1951 |
| 2,545,118 | St. Clair | Mar. 13, 1951 |
| 2,559,432 | Hunter | July 3, 1951 |
| 2,580,567 | Martin | Jan. 1, 1952 |
| 2,605,075 | Brown | July 29, 1952 |
| 2,608,373 | Tuttle et al. | Aug. 26, 1952 |
| 2,751,181 | Baldwin et al. | June 19, 1956 |
| 2,754,082 | Crandall | July 10, 1956 |

FOREIGN PATENTS

| | | |
|---|---|---|
| 244,624 | Germany | Mar. 14, 1912 |
| 343,425 | Great Britain | Feb. 9, 1931 |